United States Patent
Sirol

(10) Patent No.: US 8,791,228 B2
(45) Date of Patent: Jul. 29, 2014

(54) METHOD FOR BULK POLYMERIZATION OF LACTIDE

(75) Inventor: Sabine Sirol, Horrues (BE)

(73) Assignee: Futerro S.A., Escanaffles (BE)

( * ) Notice: Subject to any disclaimer, the term of this patent is extended or adjusted under 35 U.S.C. 154(b) by 246 days.

(21) Appl. No.: 13/511,155

(22) PCT Filed: Dec. 3, 2010

(86) PCT No.: PCT/EP2010/068860
§ 371 (c)(1),
(2), (4) Date: Jul. 17, 2012

(87) PCT Pub. No.: WO2011/067385
PCT Pub. Date: Jun. 9, 2011

(65) Prior Publication Data
US 2012/0277403 A1    Nov. 1, 2012

(30) Foreign Application Priority Data
Dec. 3, 2009  (BE) .................................. 2009/0745

(51) Int. Cl.
*C08G 63/83*    (2006.01)
(52) U.S. Cl.
USPC ........... 528/357; 525/410; 525/415; 525/450; 528/354

(58) Field of Classification Search
USPC .................. 525/410, 415, 450; 528/354, 357
See application file for complete search history.

(56) References Cited

U.S. PATENT DOCUMENTS 3,021,310 A * 2/1962 Cox et al. ...................... 528/357
2011/0077380 A1 3/2011 Williams et al.

OTHER PUBLICATIONS

Breyfogle, L. E., et al.; "Comparison of Structurally Analogous Zn2, Co2, and Mg2 Catalysts for the Polymerization of Cyclic Esters"; Dalton Transactions, RSC Publishing, Cambridge, GB LNKD-DOI: 10.1039/B507014G; Jan. 1, 2006; pp. 928-936; XP002534374; ISSN: 1477-9226.
Williams, C. K., et al.; "A Highly Active Zinc Catalyst for the Controlled Polymerization of Lactide"; Journal of the American Chemical Society, American Chemical Society, New York, US LNKD-, vol. 125, No. 37, Jan. 1, 2003; pp. 11350-11359; DOI: 10.1021/JA0359512; XP002534371; ISSN: 0002-7863.

* cited by examiner

*Primary Examiner* — Gregory Listvoyb

(57) ABSTRACT

Process for bulk polymerization of lactide at a temperature between 160° C. and 195° C. in the presence of a zinc-based catalyst.

9 Claims, No Drawings

METHOD FOR BULK POLYMERIZATION OF LACTIDE

CROSS-REFERENCE TO RELATED APPLICATIONS

This application claims the benefit of PCT/EP2010/068860, filed Dec. 3, 2010, which claims priority from BE 2009/0745, filed Dec. 3, 2009.

FIELD OF THE INVENTION

The present invention relates to a process for bulk polymerization of lactide, more particularly a process for polymerization in the presence of tin-free catalyst.

TECHNOLOGICAL BACKGROUND

Ring-opening polymerization is the most efficient way of obtaining aliphatic (co)polyesters from monomers selected from the group comprising lactides, of L- or D-configuration, lactones, cyclic carbonates and cyclic anhydrides. These synthetic polymers are of considerable interest as biodegradable materials.

In view of their intrinsic properties, biodegradable polymers have become an important alternative to synthetic polymers based on compounds obtained from petrochemistry, and much progress has been made both from the standpoint of synthesis and of processing of these materials. Moreover, they are used for a large number of applications, such as packaging and textiles. Among the various biodegradable polymers, polylactide (PLA) is one of the most commonly used and studied.

The ring-opening polymerization of lactide is the route of synthesis commonly used for the production of polylactide. It is generally carried out as solution polymerization or bulk polymerization (in the absence of solvent) in the presence of a catalytic system, and sometimes even in the presence of an initiator of the alcohol or amine type. The catalysts used are described in the literature and notably in patent EP 0 615 532, for example Sn(II) bis(2-ethylhexanoate), butyltin tris(2-ethylhexanoate) and dibutyltin diacetate. We may also mention the use of Lewis bases as co-catalyst, as described in patent U.S. Pat. No. 6,166,169, and notably the catalytic system tin octanoate $(Sn(Oct)_2)$/triphenyl phosphine $(P(Ph)_3)$ commonly used at present in the polymerization of lactide.

There is, however, a desire to perform ring-opening polymerization of lactide in the presence of tin-free catalysts.

There is also a desire to perform ring-opening polymerization of lactide as a bulk polymerization. In fact, bulk polymerization is particularly suited to industrial application as it provides rapid production of polylactide and direct use of the polymer, in contrast to solution polymerization, after which the polymer obtained must be separated from the solvent, which on the one hand increases the complexity of the process and on the other hand affects its economic effectiveness.

Document U.S. Pat. No. 7,169,729 discloses the solution oligomerization of D,L-lactide at 40° C. in the presence of the catalyst $Zn[N(SiMe_3)_2]_2$.

Document U.S. Pat. No. 6,297,350 discloses the bulk polymerization of L-lactide at 150° C. in the presence of alcohol and of zinc lactate as catalyst. However, the yield is still relatively low.

Document US 2007/0083019 discloses the ring-opening polymerization of oligomers of cyclic ω-hydroxycarboxylic acids in the presence of a zinc-based organometallic complex. This document does not, however, disclose the polymerization of lactide in the presence of this complex.

J. Am. Chem. Soc., 2003, 125, 11350-11359 discloses the solution polymerization of lactide at room temperature in the presence of a zinc-based organometallic complex. This document does not, however, disclose the high-temperature bulk polymerization of lactide with this complex.

SUMMARY OF THE INVENTION

The present invention relates to a process for ring-opening bulk polymerization of lactide in the presence of a tin-free catalyst.

Another aim of the present invention is to provide a process for bulk polymerization of lactide for producing polylactide of high number-average molecular weight (Mn) between 75 000 and 100 000 dalton.

Another aim of the present invention is to provide a process for bulk polymerization of lactide for producing polylactide having a polydispersity between 1.4 and 1.9.

Another aim of the present invention is to provide a process for bulk polymerization of lactide for producing polylactide with a degree of conversion of lactide to polylactide above 85%.

Finally, another aim of the present invention is to provide a process for bulk polymerization of lactide for producing colourless polylactide.

At least one of the aims is achieved by the present invention.

In the present invention, bulk polymerization of lactide means any polymerization of lactide that is carried out in the absence of solvent, in the molten state. The bulk polymerization does not exclude the solvent that is optionally required for dissolution of the catalyst.

In the present invention, polydispersity means the ratio of the weight-average molecular weight (Mw) to the number-average molecular weight (Mn).

DETAILED DESCRIPTION OF THE INVENTION

The present invention provides a process for bulk polymerization of lactide, at a temperature between 160° C. and 195° C., comprising bringing the lactide into contact with a metal catalyst of general formula (1)

in which

L is represented by formula (II)

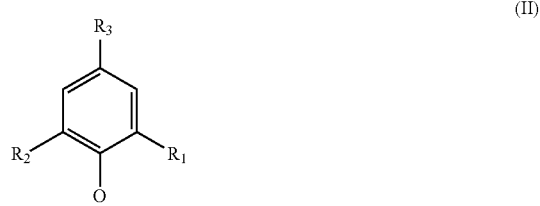

in which $R_1$ is $CH_2$—$N(R_4)$—$CH_2$—$CH_2$—$N(R_5)(R_6)$, in which $R_4$, $R_5$ and $R_6$ are radicals, which may be identical or different, selected from alkyls having from 1 to 10 carbon atoms; or in which $R_4$ and $R_5$ are joined together and each represents a methylene group and $R_6$ is a radical selected from alkyls having from 1 to 10 carbon atoms, $R_2$ and $R_3$ are radicals, which may be identical or different, selected from alkyls having from 1 to 10 carbon atoms, X is an alkyl having from 1 to 10 carbon atoms; or an alkoxide group OR' in which R' is an alkyl having from 1 to 10 carbon atoms; or the group $N(SiMe_3)_2$.

In the sense of the present invention, "alkyl" means a linear or branched, saturated hydrocarbon group, with from 1 to 10 carbon atoms. For example, this definition includes radicals such as methyl, ethyl, isopropyl, n-propyl, n-butyl, t-butyl, pentyl, n-hexyl, 2-ethylbutyl, heptyl, octyl, 2-ethylhexyl, nonyl, or decyl.

In the sense of the present invention, "alkoxide" means a group of general formula OR' where R' is an alkyl group as defined in the preceding paragraph. We may mention, as examples, the methoxy, ethoxy, propoxy, isopropoxy, t-butoxy, n-butoxy, isobutoxy, sec-butoxy, n-pentoxy, isopentoxy, sec-pentoxy, t-pentoxy, hexyloxy groups.

In the present invention, when $R_4$ and $R_5$ are joined together and each represents a methylene group and $R_6$ is a radical selected from alkyls having from 1 to 10 carbon atoms, $R_1$ can then also be represented schematically as follows:

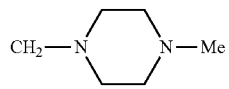

Preferably, $R_6$ is an alkyl having from 1 to 4 carbon atoms, more preferably $R_6$ is a methyl radical.

Preferably, $R_1$ is $CH_2-N(R_4)-CH_2-CH_2-N(R_5)(R_6)$ in which $R_4$, $R_5$ and $R_6$ are radicals, which may be identical or different, selected from alkyls having from 1 to 10 carbon atoms. Preferably, $R_4$, $R_5$ and $R_6$ are methyl, ethyl, isopropyl or tert-butyl, more preferably methyl or ethyl, even more preferably methyl.

Preferably, $R_2$ and $R_3$ are methyl, ethyl, isopropyl or tert-butyl, more preferably isopropyl or tert-butyl, even more preferably tert-butyl.

Preferably, X is methyl, ethyl, isopropyl, n-butyl or an alkoxide group OR' in which IR' is methyl, ethyl, isopropyl or Cert-butyl. More preferably, X is an alkoxide group in which R' is ethyl, isopropyl or tert-butyl, even more preferably ethyl.

In general, polymerization of lactide is carried out in the presence of this type of catalyst, which is used in an amount such that the lactide/catalyst molar ratio is between 1000/1 and 10 000/1, preferably between 2000/1 and 8000/1 and more preferably between 4000/1 and 6000/1.

The polymerization process of the present invention for polymerizing lactides, of L or D configuration, is carried out as a bulk polymerization, by bringing the lactide into contact with the catalyst in a reactor preferably equipped with a stirrer for high viscosity or by extrusion in a single-screw, twin-screw or multiple-screw extruder (or horizontal reactor) under inert atmosphere in the presence of argon or nitrogen. However, it can also take place under ambient atmosphere. The polymerization process is generally carried out at a temperature between 160° C. and 195° C., preferably between 165° C. and 190° C. The process can also be carried out in the presence of stabilizers and/or antioxidants that are well known by a person skilled in the art. Among the stabilizers commonly used, we may mention (2,4-ditert-butylphenyl) pentaerythritol diphosphite, also called Ultranox 626. The process can be carried out as a continuous process or a batch process.

Preferably, the lactide used in the process of the invention is the lactide of L configuration (L-L lactide) or the lactide of D configuration (D-D lactide), more preferably the lactide of L configuration.

According to a particular embodiment of the invention, the process can also comprise the use of an initiator. The initiator can be the residual water contained in the lactide, an alcohol or an amine. Preferably, the initiator of polymerization of the lactide is an alcohol or an amine.

The alcohol or the amine can be aliphatic or aromatic of general formula $R-(A)_n$, in which n is 1 or 2, A is OH or $NH_2$ and R is an alkyl radical containing from 1 to 20 carbon atoms or an aryl radical having from 6 to 30 carbon atoms. Preferably, R is an alkyl radical having from 3 to 12 carbon atoms or an aryl radical having from 6 to 10 carbon atoms. The alkyl or aryl radical can be substituted or unsubstituted. The alkyl radical can be linear, cyclic, saturated or unsaturated.

Among the amines, we may mention isopropylamine, 1,4-butanediamine, 1,6-hexanediamine, 1,4-cyclohexanediamine.

Among the alcohols, we may mention isopropanol, 1-octanol, 1,3-propanediol, 1,3-butanediol, 1,4-butanediol, 1,6-hexanediol, 1,7-heptanediol, xylene glycol.

The molar ratio of lactide to initiator, when the latter is an alcohol or an amine, can be between 50/1 and 1500/1, preferably between 100/1 and 750/1, more preferably between 300/1 and 600/1.

The applicant found that by using the tin-free catalyst, as described above, it is possible to carry out the bulk polymerization of lactide at a temperature between 160° C. and 195° C. with a high degree of conversion of lactide to polylactide while obtaining a colourless polylactide, directly after polymerization, which has high number-average molecular weight and low polydispersity, while avoiding any phenomenon of catalyst degradation during polymerization. This result was quite unexpected as it could not be obtained with other species of zinc-based catalysts generally used successfully for the solution polymerization of lactide.

EXAMPLES AND COMPARATIVE EXAMPLES

In the examples and comparative examples, the number-average molecular weight (Mn) of PLA was determined by size-exclusion chromatography in chloroform at 35° C., after initial calibration of eight polystyrene standards with known number-average molecular weight between 600 and 1 700 000 dalton. The equipment used for size-exclusion chromatography is the Agilent Technologies 1200 Series. The samples, dissolved in chloroform at a rate of 0.1% (weight/volume), were eluted at a flow of 1 ml/min through a precolumn PL gel 10pm and two gradient columns PL gel 5 μm mixed-d. The volume injected is 100 μl.

In the examples and comparative examples, the colour of the PLA was determined directly after polymerization and before any recrystallization of the PLA (crude PLA).

1. Synthesis of (2,4-di-tert-butyl-6-(((2-(dimethylamino)ethyl)(methyl)amino)methyl)phenoxy)(ethoxy)zinc, called DDTBP-Zn (OEt) hereinafter The synthesis was carried out according to the operating procedure described by Williams et al. in J. Am. Chem. Soc., 2003, 125, 11350-11359.

2. Examples 1 to 2 (Examples According to the Invention)

The bulk polymerization of L-lactide under inert atmosphere was carried out in the presence of the DDTBP-Zn (OEt) catalyst represented by the following formula:

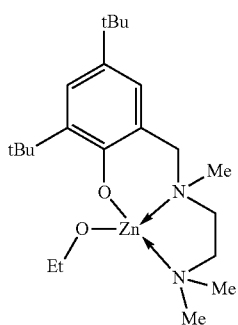

The polymerization took place in the presence of 1-octanol, as initiator, in a glass reactor of 50 ml capacity, which was filled, under inert atmosphere, with 5 g of L-lactide, catalyst and initiator in the amounts stated in Table 1. 1 ml of catalyst solution in toluene was used each time. The conversion of L-lactide to polylactide was determined after 30 minutes of polymerization on the polymer previously recrystallized from a mixture of chloroform and ethanol and then dried under vacuum.

Examples 3-6 (Comparative Examples)

The bulk polymerization of L-lactide was carried out under inert atmosphere in the presence of catalysts other than those mentioned in the process of the invention. Polymerization took place in a glass reactor of 50 ml capacity, which was filled, under inert atmosphere, with 5 g of L-lactide, catalyst and 1-octanol (initiator) in the amounts stated in Table 1. 1 ml of catalyst solution in toluene was used each time. The conversion of L-lactide to polylactide was measured in the same way as was described for examples 1-2 according to the invention.

The catalysts tested are:
zinc bis[bis(trimethylsilyl)amide] identified hereinafter as $Zn[N(SiMe_3)_2]_2$,
diethylzinc identified hereinafter as DEZ and
zinc trifluoromethane sulphonate identified hereinafter as $Zn(OTf)_2$.

The results are shown below in Table 1. Regarding example 6 (comparative), no polymerization reaction took place in the presence of zinc trifluoromethane sulphonate.

in which
L is represented by formula (II)

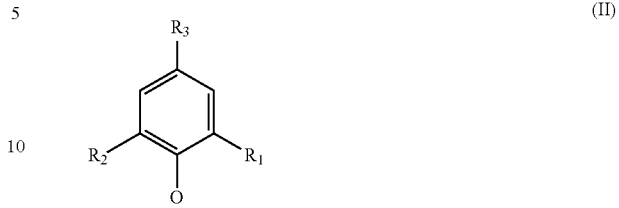

in which
$R_1$ is $CH_2$—$N(R_4)$—$CH_2$—$CH_2$—$N(R_5)(R_6)$ in which $R_4$, $R_5$ and $R_6$ are radicals, which may be identical or different, selected from alkyls having from 1 to 10 carbon atoms; or in which
$R_4$ and $R_5$ are joined together and each represents a methylene group and $R_6$ is an alkyl having from 1 to 10 carbon atoms,
$R_2$ and $R_3$ are radicals, which may be identical or different, selected from alkyls having from 1 to 10 carbon atoms,
X is an alkyl having from 1 to 10 carbon atoms; or an alkoxide group OR' in which R' is an alkyl having from 1 to 10 carbon atoms; or the group $N(SiMe_3)_2$.

2. Process according to claim 1, characterized in that $R_1$ is $CH_2$—$N(R_4)$—$CH_2$—$CH_2$—$N(R_5)(R_6)$ in which $R_4$, $R_5$ and $R_6$ are methyl, ethyl, isopropyl or tert-butyl.

3. Process according to claim 2, characterized in that $R_4$, $R_5$ and $R_6$ are methyl or ethyl, preferably methyl.

4. Process according to claim 1, characterized in that $R_2$ and $R_3$ are methyl, ethyl, isopropyl or tert-butyl.

5. Process according to claim 4, characterized in that $R_2$ and $R_3$ are isopropyl or tert-butyl, preferably tert-butyl.

6. Process according to claim 1, characterized in that X is methyl, ethyl, isopropyl, n-butyl or an alkoxide group OR' in which R' is methyl, ethyl, isopropyl or t-butyl.

7. Process according to claim 6, characterized in that X is an alkoxide group in which R' is ethyl, isopropyl or t-butyl, preferably ethyl.

8. Process according to claim 1, characterized in that the catalyst is used in an amount such that the lactide/catalyst molar ratio is between 1000/1 and 10 000/1, preferably between 2000/1 and 8000/1.

TABLE 1

| Examples | Polymerization temperature (° C.) | Lactide/ octanol (mol/mol) | Lactide/ catalyst (mol/mol) | Catalyst | Conversion of lactide to polylactide (%) | Colour of polylactide (crude PLA) | Mn (Dalton) | Polydispersity index (Mw/Mn) |
|---|---|---|---|---|---|---|---|---|
| 1 (invention) | 185 | 316 | 5028 | DDTBP-Zn(OEt) | 90 | Colourless | 77000 | 1.8 |
| 2 (invention) | 185 | 307 | 4876 | DDTBP-Zn(OEt) | 88 | Colourless | 88000 | 1.6 |
| 3 (comparative) | 185 | 340 | 5607 | $Zn[N(SiMe_3)_2]_2$ | 83 | Yellow | 66000 | 1.5 |
| 4 (comparative) | 185 | 323 | 5270 | DEZ | 81 | Yellow | 78000 | 1.5 |
| 5 (comparative) | 185 | 320 | 5221 | DEZ | 83 | Slightly yellowish | 66000 | 1.4 |
| 6 (comparative) | 185 | 362 | 4984 | $Zn(OTf)_2$ | — | — | — | — |

—: not applicable

The invention claimed is:

1. Process for bulk polymerization of lactide, at a temperature between 160° C. and 195° C., comprising bringing the lactide into contact with a metal catalyst of general formula (I)

$$L-Zn-X \quad (I)$$

9. Process according to claim 1, characterized in that the process is carried out in the presence of a polymerization initiator.

* * * * *